UNITED STATES PATENT OFFICE.

HARRY SHACKLETON, OF NORTH PROVIDENCE, RHODE ISLAND, AND JOHN GORDON, OF NEW BEDFORD, MASSACHUSETTS.

POLISHING COMPOSITION.

1,382,127. Specification of Letters Patent. Patented June 21, 1921.

No Drawing. Application filed October 18, 1920. Serial No. 417,612.

*To all whom it may concern:*

Be it known that we, HARRY SHACKLETON, a citizen of the United States, and JOHN GORDON, a subject of the King of Great Britain, residing, respectively, at North Providence, county of Providence, State of Rhode Island, and at New Bedford, in the county of Bristol and State of Massachusetts, have invented certain new and useful Improvements in Polishing Composition, of which the following is a specification.

Our invention relates to a cleanser and polish for furniture, automobiles, and other objects having a painted, coated, or varnished surface, as well as marble.

The essential objects of our invention are to impart a lasting polished surface, to render the treated surface appreciably unaffected by heat, rain, and moisture, and produce a surface to which dust does not adhere; and one which has a non-greasy appearance.

To the above ends essentially our invention consists in such a mixture of ingredients as fall within the scope of the appended claims.

In detail our composition comprises equal quantities each of raw linseed oil, malt vinegar, turpentine, and alcohol.

These ingredients are mixed in the following manner. The raw linseed oil and malt vinegar are first mixed together thoroughly by agitation. Thereafter to this mixture is added the turpentine and alcohol.

We do not claim any composition composed of the above ingredients mixed in proportions substantially differing from those above indicated.

We claim:—

1. A polishing composition consisting solely of a mixture of raw linseed oil, malt vinegar, turpentine and alcohol proportioned to each other in equal parts.

2. The herein described process of forming a dry finished polishing composition, which consists in first mixing raw linseed oil and malt vinegar in equal proportions and agitating the same, and then adding thereto turpentine and alcohol in equal proportions.

In testimony whereof we have affixed our signatures.

HARRY SHACKLETON
JOHN GORDON.